United States Patent Office 3,579,572
Patented May 18, 1971

3,579,572
PROCESS FOR THE PRODUCTION OF TEREPHTHALIC ACID
Garabed Amedjian, Maurice Fenoglio, and Michel Oberdorf, Lyon, France, assignors to Rhone-Poulenc S.A., Paris, France
No Drawing. Filed Jan. 5, 1968, Ser. No. 695,879
Int. Cl. C07c 63/26
U.S. Cl. 260—515        6 Claims

ABSTRACT OF THE DISCLOSURE

Terephthalic acid is produced by treating aqueous lithium or magnesium terephthalate solution with carbon dioxide under pressure, and separating the precipitated terephthalic acid.

---

The present invention relates to the production of terephthalic acid from neutral lithium or magnesium terephthalate.

Various processes for isolating terephthalic acid from the alkali metal terephthalates obtained by isomerisation of alkali metal phthalates or isophthalates (notably the potassium and sodium salts) in the presence of catalysts and optionally under carbon dioxide pressure have been proposed. These processes have also been employed to reprecipitate terephthalic acid from aqueous solutions of alkali metal terephthalates which have been subjected to various purifying treatments. Generally, terephthalic acid is liberated by the action of a strong acid such as hydrochloric acid or sulphuric acid on an alkali metal terephthalate, as proposed in French Pat. No. 1,120,544. In this case, however, the alkali metal, which is converted into the sulphate or chloride, cannot be directly reused in the manufacture of treatment of terephthalic acid. To recover the alkali metal, it is convenient first to treat the alkali metal sulphate or chloride to obtain the corresponding hydroxide or carbonate which may then be directly employed in the preparation of terephthalates.

It has already been proposed to lessen this disadvantage, in the case of sodium, potassium or ammonium terephthalates, by using a two-stage treatment comprising, in a first stage, the formation of a very sparingly soluble acid terephthalate which precipitates, by the action of carbon dioxide on an aqueous solution of the neutral salt, followed, in the second stage, by conversion of the acid salt into terephthalic acid either by hydrolysis (as in French Pat. No. 1,153,784) or by the action of a carboxylic acid such as that employed in the preparation of alkali metal terephthalates (as in French Pat. No. 1,167,087). In this process, the alkali metal (sodium or potassium) is in a form in which it can be reused directly in further operations for the preparation of sodium or potassium terephthalate, which is not the case in the process of French Pat. No. 1,120,544, in which the alkali metal finally changes into the form of sulphate or chloride. The conversion of the neutral terephthalate into the free acid, however, involves two successive operations.

It has now been found, and this forms the subject of the present invention, that terephthalic acid is directly obtained when lithium or magnesium terephthalate is treated in aqueous solution with carbon dioxide under pressure, at a temperature between its solidification temperature and 80° C.

It was particularly unexpected that terephthalic acid would be liberated by the action of carbon dioxide on lithium or magnesium terephthalate, because on the one hand the acid terephthalate is obtained with alkali metal terephthalates other than lithium terephthalate, and on the other hand terephthalic acid is a stronger acid ($pK_1=2.8 \times 10^{-4}$ and $pK_2=4 \times 10^{-5}$) tan carbon dioxide ($pK_1=4.3 \times 10^{-7}$).

The new process is particularly advantageous. Apart from the fact that terephthalic acid is obtained in a single stage, the metal employed in the preparation of the terephthalate is completely recovered in the form of an aqueous bicarbonate solution which may be recycled for the preparation of lithium or magnesium terephthalate. The carbon dioxide which is formed in the course of this recycling may also be recovered and reused, after compression and optional addition of fresh carbon dioxide, for further precipitations of terephthalic acid.

Because of the advantages afforded by the present process, many operations which were previously carried out on aqueous sodium, potassium or ammonium terephthalate solutions are more advantageously applied to lithium or magnesium terephthalate solutions. For example, this is the case with the purification of crude terephthalic acid.

In the new process, carbon dioxide may conveniently be employed at pressures ranging from 5 to 60 bars and preferably from 20 to 40 bars. The temperature at which the aqueous terephthalate solution is treated with $CO_2$ may be between the solidification temperature of the solution and 80° C., and preferably between 0° and 30° C. It is particularly advantageous to associate the highest pressures with the lowest temperatures in order to ensure that the precipitation of terephthalic acid is as complete as possible.

Regardless of the conditions chosen, a terephthalic acid precipitate and an aqueous solution containing lithium or magnesium bicarbonate and lithium or magnesium terephthalate are obtained. The terephthalic acid is separated from the solution by filtration, preferably under conditions of pressure and temperature analogous to those of the precipitation reaction. The aqueous solution of lithium or magnesium terephthalate and lithium or magnesium bicarbonate resulting from the filtration may advantageously be reused in a further operating cycle, the bicarbonate thus supplying the metal necessary for this further cycle.

The solution resulting from the filtration may also be concentrated to a suitable salt content, which depends upon the temperature, and then subjected to a further treatment with carbon dioxide, which results in a further precipitation of terephthalic acid. This succession of operations may be repeated so as to precipitate as much terephthalic acid as possible.

The direct recycling of the aqueous solution of the lithium or magnesium salts obtained by the action of carbon dioxide on the aqueous lithium or magnesium terephthalate solution followed by filtration is preferred, because it is suitable for continuous operation.

The following examples illustrate the invention.

EXAMPLE 1

Into a six-litre, round-bottomed glass flask provided with a stirring system, a thermometer, a reflux condenser and a heating system are introduced 2500 cc. of water, 200 g. of terephthalic acid containing 0.84% by weight of p-formylbenzoic acid, and 94 g. of lithium carbonate. The contents of the flask are heated with stirring, and dissolution is complete when the temperature reaches 50° C. The contents of the flask are heated to reflux, 5 g. of potassium permanganate are then added, and the reflux is maintained for 45 minutes. 5 g. of animal charcoal are added and the reflux is continued for a further 45 minutes. The solution is filtered hot to eliminate the charcoal and the insoluble products formed in the course of the oxidation. 2600 cc. of clear solution are obtained.

This solution is introduced into a 3.6-litre stainless-steel autoclave provided with a gas admission duct and a purging device, and connected through a valve to a pressure filtration apparatus which comprises at its base a pipe for the discharge of the filtrate, which in turn is provided with a valve. The whole apparatus is twice purged with a current of carbon dioxide, and the valve leading to the filter is then closed and a carbon dioxide pressure of 25 bars is maintained in the autoclave, while the temperature of the solution is adjusted to 25° C. The contents of the autoclave are maintained under these conditions for 30 minutes, and the valve leading to the filter is then opened under a carbon dioxide pressure of 25 bars. The precipitate collected in the filter is washed with 2× 100 cc. of water at 25° C., separated and dried. 66 g. of terephthalic acid containing only 0.003% of p-formylbenzoic acid are thereby obtained.

The washing liquors and the solution resulting from the filtration of the terephthalic acid are introduced into the 6-litre round-bottomed flask previously employed. 67 g. of the same initial impure terephthalic acid are added and the sequence of operations is repeated. 66g. of terephthalic acid containing only 0.003% of p-formylbenzoic acid are again obtained. Using each time the filtrate previously obtained, these operations are repeated 10 times, the same quantity of terephthalic acid of the same purity being recovered each time.

EXAMPLE 2

The experiment of Example 1 is repeated, the precipitation being carried out at different temperatures. The results set out in the following table are obtained:

| Temperature in ° C.: | Weight of terephthalic acid isolated in grams |
|---|---|
| 80 | 0 |
| 60 | 15 |
| 40 | 35 |
| 25 | 66 |
| 16 | 85 |
| 3 | 110 |

EXAMPLE 3

The experiment of Example 1 is repeated, the precipitation being carried out under different pressures, at a temperature of 16° C. The following results are obtained:

| Reaction pressure in bars | Filtration pressure in bars | Weight of isolated terephthalic acid in g. |
|---|---|---|
| 5 | 5±1 | 10 |
| 10 | 10±2 | 38 |
| 15 | 15±2 | 53 |
| 20 | 20±3 | 77 |
| 25 | 25±3 | 85 |
| 30 | 30±3 | 98 |
| 35 | 35±3 | 101 |
| 40 | 40±3 | 101 |

EXAMPLE 4

Into a 6-litre, round-bottomed glass flask provided with a stirring system, a thermometer, a reflux condenser and a heating system are introduced 107 g. of terephthalic acid containing 0.84% by weight of p-formylbenzoic acid, 64.5 g. of magnesium carbonate (containing 40% of MgO) and 2500 cc. of water. The contents of the flask are then heated with stirring at a temperature of about 50° C. The dissolution is complete in 15 minutes, and 3.1 g. of potassium permanganate are then added. The mixture is maintained at 50° C. for 45 minutes, 2.5 g. of animal charcoal are then added, and the temperature is maintained at 50° C. for 30 minutes. The solution is filtered hot to eliminate the charcoal and the insoluble products formed during the oxidation. 2550 cc. of clear solution are thus obtained.

This solution is introduced into a stainless-steel autoclave identical to that described in Example 1. The whole apparatus is twice purged with a current of carbon dioxide and the valve leading to the filter is then closed and a carbon dioxide pressure of 25 bars is maintained in the autoclave, the temperature of the solution being adjusted to 16° C. The whole is maintained under these conditions for 30 minutes. The valve leading to the filter is then opened under a carbon dioxide pressure of 25 bars. The precipitate collected on the filter is washed with 2× 100 cc. of cold water, separated and dried. In this way, 53 g. of 100% terephthalic acid containing only 0.020% of p-formylbenzoic acid are obtained.

The filtrate is recharged into the 6-litre flask previously employed. 53 g. of crude terephthalic acid containing 0.84% by weight of p-formylbenzoic acid are added and the sequence of operations is repeated. 53 g. of purified 100% terephthalic acid containing only 0.017% of p-formylbenzoic acid are again obtained. These operations are repeated three times, using in each instance the filtrate previously obtained, and the same quantity of terephthalic acid, having the same purity, is recovered each time.

We claim:

1. Process for the production of terephthalic acid which comprises treating an aqueous lithium or magnesium terephthalate solution with carbon dioxide under pressure, at a temperature between its solidification temperature and 80° C., and separating the terephthalic acid which precipitates.

2. Process according to claim 1, wherein the pressure of carbon dioxide is 5 to 60 bars.

3. Process according to claim 2, wherein the pressure is 20 to 40 bars.

4. Process according to claim 1, wherein the terephthalate solution is maintained at a temperature at most equal to 30° C. in the treatment with carbon dioxide.

5. Process according to claim 1, wherein the precipitated terephthalic acid is separated under pressure of carbon dioxide.

6. Process according to claim 1, wherein the terephthalate solution is made up by dissolving terephthalic acid in the mother liquor from a previous separation of terephthalic acid.

References Cited

UNITED STATES PATENTS 2,927,130   3/1960   Schutt _____ 260—515
3,043,846   7/1962   Blaser et al. _____ 260—515

JAMES A. PATTEN, Primary Examiner

U.S. Cl. X.R.

260—525

UNITED STATES PATENT OFFICE
CERTIFICATE OF CORRECTION

Patent No. 3,579,572          Dated May 18, 1971

Inventor(s) Garabed Amedjian, Maurice Fenoglio & Michel Oberdorf

It is certified that error appears in the above-identified patent and that said Letters Patent are hereby corrected as shown below:

Priority is claimed based on French application 91,791 filed January 19, 1967 and 121,023 filed September 14, 1967.

Signed and sealed this 28th day of September 1971.

(SEAL)
Attest:

EDWARD M. FLETCHER, JR.
Attesting Officer

ROBERT GOTTSCHALK
Acting Commissioner of Patents